(12) United States Patent
Brown et al.

(10) Patent No.: US 11,008,439 B2
(45) Date of Patent: May 18, 2021

(54) SOLID POLYMERIC ARTICLES HAVING HYDROPHOBIC COMPOUNDS INTERMIXED THEREIN

(71) Applicant: THE CHEMOURS COMPANY FC, LLC, Wilmington, DE (US)

(72) Inventors: Gerald Oronde Brown, Swedesboro, NJ (US); John Christopher Sworen, Lincoln University, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 194 days.

(21) Appl. No.: 15/764,901

(22) PCT Filed: Sep. 30, 2016

(86) PCT No.: PCT/US2016/054584
§ 371 (c)(1),
(2) Date: Mar. 30, 2018

(87) PCT Pub. No.: WO2017/059157
PCT Pub. Date: Apr. 6, 2017

(65) Prior Publication Data
US 2018/0282514 A1 Oct. 4, 2018

Related U.S. Application Data

(60) Provisional application No. 62/236,335, filed on Oct. 2, 2015.

(51) Int. Cl.
| | |
|---|---|
| C08K 5/1535 | (2006.01) |
| B29C 45/00 | (2006.01) |
| B29C 45/14 | (2006.01) |
| H01B 3/30 | (2006.01) |
| H01C 7/02 | (2006.01) |
| B29K 67/00 | (2006.01) |
| B29K 105/00 | (2006.01) |
| B29K 705/10 | (2006.01) |
| B29L 31/34 | (2006.01) |
| H01B 7/02 | (2006.01) |

(52) U.S. Cl.
CPC ........ C08K 5/1535 (2013.01); B29C 45/0001 (2013.01); B29C 45/14549 (2013.01); B29C 45/14639 (2013.01); H01B 3/30 (2013.01); H01B 7/0275 (2013.01); B29K 2067/00 (2013.01); B29K 2105/0005 (2013.01); B29K 2705/10 (2013.01); B29K 2995/0093 (2013.01); B29L 2031/3462 (2013.01)

(58) Field of Classification Search
CPC ...... C08K 5/1535; H01B 3/30; H01B 7/0275; B29C 45/14639; B29C 45/14549; B29C 45/0001; B29L 2031/3462; B29K 2995/0093; B29K 2705/10; B29K 2105/0005; B29K 2067/00

USPC .......................................................... 524/111
See application file for complete search history.

(56) References Cited

U.S. PATENT DOCUMENTS

| | | |
|---|---|---|
| 3,427,265 A | 2/1969 | Brinker |
| 5,115,004 A | 5/1992 | Mochizuki et al. |
| 5,128,399 A | 7/1992 | Mochizuki et al. |
| 5,228,157 A | 7/1993 | Johenning et al. |
| 5,853,831 A | 12/1998 | Urabe et al. |
| 6,075,064 A | 6/2000 | Muller |
| 6,150,020 A | 11/2000 | Dharmadhikary et al. |
| 6,670,429 B2 | 12/2003 | Appelman et al. |
| 6,858,290 B2 | 2/2005 | Mrozinski et al. |
| 8,026,188 B2 | 9/2011 | Mor |
| 9,688,830 B2 | 6/2017 | Emmrich-Smolczyk et al. |
| 2007/0004864 A1* | 1/2007 | Beatty ..................... C08L 23/10 525/240 |
| 2007/0049683 A1 | 3/2007 | Kim et al. |
| 2008/0090480 A1* | 4/2008 | Akimoto .................. C08K 5/55 442/328 |
| 2009/0211968 A1 | 8/2009 | Ho et al. |
| 2009/0312247 A1 | 12/2009 | Stephan |
| 2010/0203097 A1 | 8/2010 | Tanaka |
| 2012/0010307 A1 | 1/2012 | Pawloski et al. |
| 2013/0184387 A1* | 7/2013 | Tahara .................. B60C 1/0016 524/110 |
| 2014/0031145 A1 | 1/2014 | Kitamura et al. |
| 2014/0065906 A1 | 3/2014 | Kim et al. |
| 2014/0221518 A1 | 8/2014 | Emmrich-Smolczyk et al. |
| 2014/0295724 A1 | 10/2014 | Sworen et al. |
| 2014/0296386 A1 | 10/2014 | Maeda et al. |
| 2014/0309350 A1 | 10/2014 | Kabeya et al. |
| 2015/0080518 A1* | 3/2015 | Moniruzzaman .......... C08J 5/10 524/504 |
| 2015/0218334 A1 | 8/2015 | Halbach et al. |
| 2015/0344748 A1 | 12/2015 | Wohl et al. |
| 2016/0090508 A1 | 3/2016 | Sworen et al. |
| 2016/0090686 A1 | 3/2016 | Sworen et al. |
| 2017/0218154 A1 | 8/2017 | Huang |

FOREIGN PATENT DOCUMENTS

| | | |
|---|---|---|
| CA | 2114874 A1 | 8/1994 |
| CN | 103642200 A | 3/2014 |

(Continued)

OTHER PUBLICATIONS

International Search Report and Written Opinion for PCT/US2016/054584 dated Dec. 1, 2016.

(Continued)

*Primary Examiner* — Angela C Scott

(57) ABSTRACT

The present invention relates to a three-dimensional solid polymeric article having surface effects comprising a polymer composition and 0.1 to 20% by weight of a hydrophobic compound, based on the total weight of the solid polymeric article, where the hydrophobic compound is intermixed throughout the polymer composition and throughout three-dimensional solid polymeric article; and where the hydrophobic compound is selected from a cyclic alcohol which is substituted with at least two hydrophobic groups.

9 Claims, No Drawings

(56) References Cited

FOREIGN PATENT DOCUMENTS

| | | | |
|---|---|---|---|
| CN | 107400350 | A | 11/2017 |
| EP | 0471554 | | 2/1992 |
| EP | 680981 | A1 | 11/1995 |
| EP | 1464677 | | 10/2004 |
| EP | 1984415 | B1 | 1/2011 |
| EP | 2604650 | | 3/2013 |
| EP | 2604649 | | 6/2013 |
| EP | 2762509 | A1 | 2/2016 |
| GB | 1049126 | A | 11/1966 |
| JP | H04-218650 | | 8/1992 |
| JP | 2004-506054 | A | 2/2004 |
| JP | 2004250508 | A | 9/2004 |
| JP | 2012-036351 | A | 2/2012 |
| JP | 2013-144772 | A | 7/2013 |
| KR | 101291839 | B1 | 7/2013 |
| KR | 20150044962 | A | 4/2015 |
| WO | 2002/12383 | | 2/2001 |
| WO | 200512429 | A1 | 2/2005 |
| WO | 200561571 | A1 | 7/2005 |
| WO | 200843545 | A1 | 4/2008 |
| WO | 2014160906 | A | 10/2014 |
| WO | 2014/136842 | | 12/2014 |
| WO | 2018232968 | A | 12/2018 |

OTHER PUBLICATIONS

Korean Office Action dated Nov. 27, 2019 in KR10-2018-7011944, 5 pages.
Chinese Office Action dated Sep. 17, 2019 in CN 201680059135.2, received Oct. 20, 2019, 10 pages.

* cited by examiner

SOLID POLYMERIC ARTICLES HAVING HYDROPHOBIC COMPOUNDS INTERMIXED THEREIN

FIELD OF THE INVENTION

Hydrophobic cyclic sugar alcohols are employed as polymer resin additives to provide repellency surface effects to the finished solid articles.

BACKGROUND OF THE INVENTION

Various compositions are known to be useful as treating agents to provide surface effects to substrates. Surface effects include repellency to moisture, soil and stain resistance, and other effects which are particularly useful for hard or fibrous substrates such as fibers, fabrics, textiles, carpets, paper, leather, stone and tile, glass, metal, and other such substrates. Many such treating agents are partially fluorinated polymers or copolymers.

Fluorinated polymer compositions having utility as fibrous substrate treating agents generally contain pendant perfluoroalkyl groups of three or more carbon atoms, which provide oil- and water-repellency when the compositions are applied to fibrous substrate surfaces. The perfluoroalkyl groups are generally attached by various connecting groups to polymerizable groups not containing fluorine. The resulting monomer is then generally copolymerized with other monomers which confer additional favorable properties to the substrates. Various specialized monomers may be incorporated to impart improved cross-linking, latex stability and substantivity. Since each ingredient may impart some potentially undesirable properties in addition to its desirable ones, the specific combination is directed to the desired use. These polymers are generally marketed as aqueous emulsions for easy application to the fibrous substrates.

Various attempts have been made to increase the oil- and water-repellency imparted an article while reducing the amount of fluorinated polymer required, i.e., boost the efficiency or performance of the treating agent. One method is to incorporate blocked isocyanates or melamine resins. However, only limited amounts can be used because these ingredients tend to adversely affect the handle (the feel) of the fibrous substrate. Another approach employs use of various extender polymers. These are typically hydrocarbon polymers in aqueous emulsions, which are blended with the fluorinated polymer emulsion before application to the substrate.

Jariwala et al. (U.S. Pat. No. 5,228,157) discloses fluorochemical compounds for use as treating agents or polymer melt additives for the purposes of providing oil-, water-, or stain repellency to shaped articles such as fibers.

BRIEF SUMMARY OF THE INVENTION

There is a need for surface effect compositions which provide hydrophobicity performance with improved fluorine efficiency in polymeric resin articles. The present invention provides such a composition.

The present invention relates to a three-dimensional solid polymeric article having surface effects comprising a polymer composition and 0.1 to 20% by weight of a hydrophobic compound, based on the total weight of the solid polymeric article, where the hydrophobic compound is intermixed throughout the polymer composition and throughout three-dimensional solid polymeric article; where the hydrophobic compound is selected from a cyclic sugar alcohol which is substituted with at least two $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons; and each $R^2$ is independently $-H$, a linear or branched alkyl group having 6 to 30 carbons.

The invention further relates to a method of imparting a surface effect to a polymeric article comprising contacting a flowable or liquid polymer composition with 0.1% by weight to 20% by weight of a hydrophobic compound, based on the total weight of the polymer composition, to form a treated polymer composition, and allowing or causing the polymer composition to solidify to form a treated polymeric article, where the treatment composition comprises a hydrophobic compound selected from a cyclic sugar alcohol which is substituted with at least two $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons; each $R^2$ is independently $-H$, a linear or branched alkyl group having 6 to 30 carbons.

DETAILED DESCRIPTION OF THE INVENTION

Trademarks are indicated herein by capitalization.

The present invention provides three-dimensional solid polymeric articles having improved water repellency, oil or stain repellency, and/or other hydrophobic surface effects. The treated articles provide enhanced performance and durability compared to traditional non-fluorinated commercially available treatment agents. Furthermore, the hydrophobic compound additives of the present invention can be derived from bio-sourced materials.

The present invention relates to a three-dimensional solid polymeric article having surface effects comprising a polymer composition and 0.1 to 20% by weight of a hydrophobic compound, based on the total weight of the solid polymeric article, where the hydrophobic compound is intermixed throughout the polymer composition and throughout three-dimensional solid polymeric article; where the hydrophobic compound is selected from a cyclic sugar alcohol which is substituted with at least two $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons; and each $R^2$ is independently $-H$, a linear or branched alkyl group having 6 to 30 carbons. The $-(CH_2CH_2O)-$ represents oxyethylene groups (EO) and $-(CH(CH_3)CH_2O)-$ represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example. In one embodiment, n+m is 1 to 20; in another embodiment, n+m is 1 to 15; and in a third embodiment, n+m is 1 to 12.

The cyclic alcohol is selected from a saccharide, reduced sugar, aminosaccharide, aldonic acid, or aldonic acid lactone. Mixtures of these compounds may also be used. The hydrophobic compounds are substituted with at least two —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CH$_2$O)$_m$C(O)$R^1$; or mixtures thereof. Such a substitution lends hydrophobic character to the monomer, and to the polymer molecules. In one embodiment, the hydrophobic compound is substituted with at least three —$R^1$; —C(O)$R^1$; —(CH$_2$CH$_2$O)$_n$(CH(CH$_3$)CH$_2$O)$_m$$R^2$; —(CH$_2$CH$_2$O)$_n$(CH(CH$_3$)CH$_2$O)$_m$C(O)$R^1$; or mixtures thereof.

These substituted compounds can be made by the reaction of a sugar alcohol with at least one fatty acid or alkoxylated fatty acid, such as by esterification of a fatty acid. Examples of such sugar alcohols include but are not limited to aldoses and ketoses such as those compounds derived from tetroses, pentoses, hexoses, and heptoses. Specific examples include glucose, allose, altrose, mannose, xylose, lyxose, galactose, talose, fructose, 1,4-anhydro-D-glucitol, 2,5-anhydro-D-mannitol, 2,5-anhydro-L-iditol, sorbitan, mannoheptulose, glucopyranose, mannopyranose, talopyranose, allopyranose, altropyranose, idopyranose, gulopyranose, inositol, ascorbic acid, gluconic acid lactone, glyceric acid lactone, xylonic acid lactone, isosorbide, glucosamine, galactosamine, or mixtures thereof.

Suitable fatty acids include, but are not limited to, caprylic acid, capric acid, lauric acid, mysteric acid, palmitic acid, stearic acid, arachidic acid, behenic acid, lignoceric acid, alkoxylated versions of these acids, and mixtures thereof.

In one embodiment, $R^1$ is a linear or branched alkyl group having 11 to 29 carbons, and in another embodiment, $R^1$ is a linear or branched alkyl group having 17 to 21 carbons. In one embodiment, $R^2$ is a linear or branched alkyl group having 12 to 30 carbons, in another embodiment, $R^2$ is a linear or branched alkyl group having 18 to 30 carbons, and in another embodiment, $R^2$ is a linear or branched alkyl group having 18 to 22 carbons. In one embodiment, the fatty acid or long-chain alcohol substitution of the cyclic sugar alcohols has a melting point of at least −59° C. In another embodiment, it has a melting point of at least 0° C., and in a third embodiment, it has a melting point of at least 40° C.

In one embodiment, the hydrophobic compound is selected from Formula (Ia):

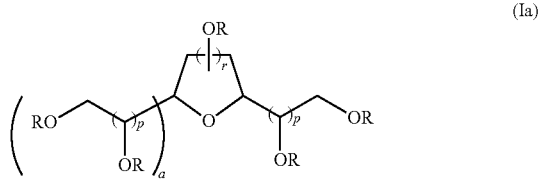

(Ia)

wherein each R is independently —H; —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$; each n is independently 0 to 20; each m is independently 0 to 20; m+n is greater than 0; r is 1 to 3; a is 0 or 1; p is independently 0 to 2; provided that a is 0 when r is 3; each $R^1$ is independently a linear or branched alkyl group having 5 to 29 carbons; and each $R^2$ is independently —H, or a linear or branched alkyl group having 6 to 30 carbons; provided at least one R is —H and at least two R groups are a —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$.

Where the hydrophobic compound is Formula (Ia), any suitable substituted reduced sugar alcohol may be employed, including esters of 1,4-sorbitan, esters of 2,5-sorbitan, and esters of 3,6-sorbitan. In one embodiment, the hydrophobic compound is selected from Formula (a) to be Formula (Ia'):

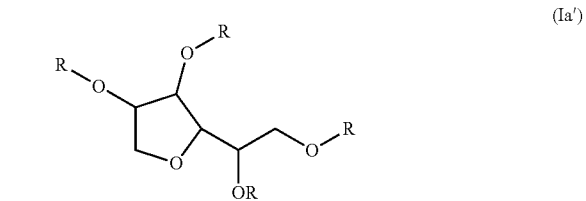

(Ia')

wherein R is further limited to —H; —$R^1$; or —C(O)$R^1$ and at least two R groups are —C(O)$R^1$ or $R^1$. Compounds used to form residues of Formula (Ia'), having at least one of R is —H and at least one R is selected from —C(O)$R^1$, are commonly known as alkyl sorbitans. These sorbitans can be di-substituted or tri-substituted with —C(O)$R^1$. It is known that commercially available sorbitans, such as SPAN, contain a mixture of the various sorbitans ranging from where each R is H (un-substituted), and sorbitans where each R is —C(O)$R^1$ (fully substituted); wherein $R^1$ is a linear or branched alkyl group having 5 to 29 carbons; and mixtures of various substitutions thereof. The commercially available sorbitans may also include amounts of sorbitol, isosorbide, or other intermediates or byproducts.

In one embodiment, at least two R groups are —C(O)$R^1$, and $R^1$ is a linear branched alkyl group having 5 to 29 carbons. In another embodiment, $R^1$ is a linear or branched alkyl group having 7 to 21 carbons, and in a third embodiment, $R^1$ is a linear or branched alkyl group having 11 to 21 carbons. Preferred compounds used to form these residues include di- and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds include di- and tri-substituted sorbitan stearates or sorbitan behenins.

In one embodiment, a compound of Formula (Ia) is employed, wherein at least two R groups are independently —(CH$_2$CH$_2$O)$_n$(CH(CH$_3$)CH$_2$O)$_m$$R^2$ or —(CH$_2$CH$_2$O)$_n$(CH(CH$_3$)CH$_2$O)$_m$C(O)$R^1$. Compounds of Formula (Ia), wherein at least two R groups are —(CH$_2$CH$_2$O)$_n$(CH(CH$_3$)CH$_2$O)$_m$$R^2$ or —(CH$_2$CH$_2$O)$_n$(CH(CH$_3$)CH$_2$O)$_m$C(O)$R^1$, wherein each m is independently 0 to 20, each n is independently 0 to 20, and n+m is greater than 0 are known as polysorbates and are commercially available under the tradename TWEEN.

These polysorbates can be di-substituted or tri-substituted with alkyl groups $R^1$ or $R^2$. It is known that commercially available polysorbates contain a mixture of the various polysorbates ranging from where each $R^2$ is H (unsubstituted), and polysorbates where each $R^1$ is a linear or branched alkyl group having 5 to 29 carbons (fully substituted); and mixtures of various substitutions thereof. Examples of compounds of Formula (Ia) include polysorbates such as polysorbate tristearate and polysorbate monostearate. Reagents may include mixtures of compounds having various values for R, R¹, and R², and may also include mixtures of compounds where R¹ comprises at least one unsaturated bond with compounds where R¹ is fully saturated.

Compounds of Formula (Ia) can all be bio-based derived. By "bio-based derived", it is meant that at least 10% of the material can be produced from non-crude oil sources, such as plants, other vegetation, and tallow. In one embodiment, the hydrophobic compound is from about 10% to 100% bio-based derived. In one embodiment, hydrophobic compound is from about 35% to 100% bio-based derived. In another embodiment, hydrophobic compound is from about 50% to 100% bio-based derived. In one embodiment, hydrophobic compound is from about 75% to 100% bio-based derived. In one embodiment, hydrophobic compound is 100% bio-based derived. The average OH value of the hydrophobic compounds can range from just greater than 0 to about 230. In one embodiment, the average OH value is from about 10 to about 175, and in another embodiment, the average OH value is from about 25 to about 140.

The three-dimensional solid polymeric article comprises 0.1 to 20% by weight of the hydrophobic compound, based on the total weight of the solid polymeric article. In a second aspect, the article comprises 1 to 10% by weight of the hydrophobic compound; and in a third aspect, 1 to 5% by weight of the hydrophobic compound based on the total solids weight of the solid polymeric article. The polymer composition used to form the three-dimensional solid polymeric article may further comprise aqueous or organic solvents, additional polymer resins, pigments, functional additives, surfactants, and hydrophobic surface effect agents.

The polymer composition used to form the body of the polymeric article may be any polymer resin which forms a solid material at room temperature, including but not limited to thermoplastic resins, thermoset resins, elastomeric resins, or amorphous polymers. Such polymer resins are synthetic. These include polyamide, polyester, polyepoxide, polystyrene, styrene copolymer, polyolefin, polyolefin copolymer, thermoplastic urethane, fluoroelastomers, polyfluoroolefins, acrylic polymers and copolymers, silicone, polyesters, and polycarbonate. The thermoplastic resins may be melted and shaped as desired. More specific polyamides include linear polyamide such as nylons (nylon-6 or nylon-66), polystyrene and polystyrene copolymers including ABS polymers, polyethylene and polyethylene copolymers, polypropylene and polypropylene copolymers, thermoplastic urethanes, poly(acrylic acid), poly(methyl methacrylate), poly(methyl acrylate), polymethacrylate, polyacrylate, polyesters including thermoplastic polyesters, polyethylene terephthalate, polypropylene terephthalate, and polybutylene terephalate, polyvinyl chloride, polycaprolactones, polylactic acid, and copolymers of any of the preceding polymers. The term "thermoplastic" includes thermoplastic elastomers as well. In one aspect, the polymer composition may be present in the three-dimensional solid polymeric article in an amount of 60 to 99.9% by weight; in a second aspect, 60 to 99% by weight; and in a third aspect, 75 to 99% by weight, based on the total weight of the solid polymeric article. The balance of the three-dimensional article composition comprises additives including but not limited to pigments, viscosity modifiers, dyes, and other functional additives. In one aspect, the polymer composition contains no liquid carrier, including water or solvent. In another aspect, the polymer composition contains no more than 5% of a liquid carrier.

In one embodiment, the three-dimensional solid polymeric article further comprises a hydrophobic surface effect agent to provide further surface effects to the solid polymeric article. In this case, three-dimensional solid polymeric article comprises 0.1 to 20% by weight of the hydrophobic surface effect agent, based on the total weight of the solid polymeric article. In a second aspect, the article comprises 1 to 10% by weight of the hydrophobic surface effect agent; and in a third aspect, 1 to 5% by weight of the hydrophobic surface effect agent based on the total solids weight of the solid polymeric article. Hydrophobic surface effect agents provide surface effects such as shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. In one aspect, such materials can be in the form of non-fluorinated or fluorinated cationic acrylic polymers, non-fluorinated or fluorinated anionic acrylic polymers, non-fluorinated or fluorinated nonionic acrylic polymers, partially fluorinated urethanes, fluorinated ethoxylates, fluorinated alcohols, fluorinated phosphate acids, non-fluorinated urethanes, silicones, waxes, or mixtures thereof.

Superior properties, along with desirable properties of low yellowing and good durability, are imparted to articles by the combination of the hydrophobic compounds and hydrophobic surface effect agents within the solid polymeric articles. These combined blends may be, for example, contacted with the polymer composition in the form of a dispersion in water or other solvents.

Of particular interest are fluorinated polymers to provide repellency properties to the surface of treated articles. These include fluorochemical compounds or polymers containing one or more fluoroaliphatic groups (designated here as $R_f$ groups) which are fluorinated, stable, inert, and non-polar, preferably saturated, monovalent, and both oleophobic and hydrophobic. The $R_f$ groups contain at least 3 carbon atoms, preferably 3 to 20 carbon atoms, more preferably 4 to 12 carbon atoms, and most preferably about 4 to about 6 carbon atoms. The $R_f$ groups may contain straight or branched chain or cyclic fluorinated alkylene groups or combinations thereof. The terminal portion of the $R_f$ groups is preferably a perfluorinated aliphatic group of the formula $C_nF_{2n+1}$ wherein n is from about 3 to about 20. Examples of fluorinated polymer treating agents are CAPSTONE and ZONYL available from The Chemours Company, Wilmington, Del.; ASAHI GARD from Asahi Glass Company, Ltd., Tokyo, Japan; UNIDYNE from Daikin America, Inc., Orangeburg, N.Y.; SCOTCHGARD from 3M Company, St. Paul, Minn.; and NANO TEX from Nanotex, Emeryville, Calif.

Examples of such fluorinated polymers include $R_f$-containing polyurethanes and poly(meth)acrylates. Especially preferred are copolymers of fluorochemical (meth)acrylate monomers with a co-polymerizable monovinyl compound or a conjugated diene. The co-polymerizable monovinyl compounds include alkyl (meth)acrylates, vinyl esters of aliphatic acids, styrene and alkyl styrene, vinyl halides, vinylidene halides, alkyl esters, vinyl alkyl ketones, and acrylamides. The conjugated dienes are preferably 1,3-butadienes. Representative compounds within the preceding classes include the methyl, propyl, butyl, 2-hydroxypropyl, 2-hydroxyethyl, isoamyl, 2-ethylhexyl, octyl, decyl, lauryl, cetyl, and octadecyl acrylates and methacrylates; vinyl acetate, vinyl propionate, vinyl caprylate, vinyl laurate, vinyl stearate, styrene, alpha methyl styrene, p-methylstyrene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, N-methylolacrylamide, N-methylolmethacrylamide, glycidyl acrylate, glycidyl methacrylate, amine-terminated (meth)acrylates, and polyoxy(meth)acrylates.

Hydrophobic non-fluorinated acrylic polymers include copolymers of monovinyl compounds, including alkyl (meth)acrylates, vinyl esters of aliphatic acids, styrene and alkyl styrene, vinyl halides, vinylidene halides, alkyl esters, vinyl alkyl ketones, and acrylamides. The conjugated dienes are preferably 1,3-butadienes. Representative compounds within the preceding classes include the methyl, propyl, butyl, 2-hydroxypropyl, 2-hydroxyethyl, isoamyl, 2-ethylhexyl, octyl, decyl, lauryl, cetyl, and octadecyl acrylates and methacrylates; vinyl acetate, vinyl propionate, vinyl caprylate, vinyl laurate, vinyl stearate, styrene, alpha methyl styrene, p-methylstyene, vinyl fluoride, vinyl chloride, vinyl bromide, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, N-methylolacrylamide, N-methylolmethacrylamide, glycidyl acrylate, glycidyl methacrylate, amine-terminated (meth)acrylates, and polyoxy(meth)acrylates. Hydrophobic non-fluorinated urethanes include, for example, urethanes synthesized by reacting an isocyanate compound with the hydrophobic compounds described above as an alcohol reagent. These compounds are described in US2014/0295724 and US2016/0090508.

Hydrophobic non-fluorinated nonionic acrylic polymers include, for example, polymers made by polymerizing or copolymerizing an acrylic ester of the hydrophobic compounds described above. Such compounds are described in US2016/0090686.

In one embodiment the hydrophobic surface effect agent can be a fluorinated alcohol which may be used to improve stain release properties of the end product. Any suitable fluorinated alcohol may be used. In one embodiment, the fluorinated alcohol has the formula $$R_f\text{-}A_x\text{-}Z\text{—}H \qquad (II)$$

wherein $R_f$ is a C1 to C20 linear or branched perfluoroalkyl optionally interrupted by one, two or three ether oxygen atoms; x is 0 or 1; A is $(CH_2)_k$, $(CH_2CF_2)_m(CH_2)_n$, $(CH_2)_oSO_2N(CH_3)(CH_2)_p$, $O(CF_2)_2(CH_2)_r$, or $OCHFCF_2OE$; Z is O, S, or NH; m is 1 to 4; k, n, o, p, and r are each independently 1 to 20; and E is a $C_2$ to $C_{20}$ linear or branched alkyl group optionally interrupted by oxygen, sulfur, or nitrogen atoms; a cyclic alkyl group, or a $C_6$ to $C_{10}$ aryl group. In one embodiment, the fluorinated alcohol has Formula (II) where Z is O and where $R_f$ is a $C_1$ to $C_{20}$ perfluoroalkyl group optionally interrupted by $CH_2$, $CH_2CH_2$, $SO_2N$, CFH, S, or O; and A is a direct bond or a $C_1$ to $C_6$ alkylene group. $R_f$ and A may be linear or branched. In one aspect, the fluorinated alcohol is a telomer-based alcohol, where $R_f$ is a linear perfluoroalkyl group and A is $CH_2CH_2$. In one aspect, $R_f$ is a $C_2$ to $C_6$ linear or branched perfluoroalkyl group. Specific examples of fluorinated alcohols include but are not limited to $R_fOH$, $R_fCH_2CH_2OH$, $R_fSO_2NHCH_2CH_2OH$, $R_fCH_2CH_2SCH_2CH_2OH$, $R_fCH_2CH_2CF_2CF_2CH_2CH_2OH$, $R_fCH_2CH_2$  $(CF_2CF_2CH_2CH_2)_2OH$, $R_fCH_2CF_2CH_2CH_2OH$, $R_fCH_2CF_2CH_2CF_2CH_2CH_2OH$, $R_fOCF_2CF_2CH_2CH_2OH$, $R_fCH_2OCH_2CH_2OH$, $R_fCHFCH_2CH_2OH$, $R_fCH_2O(CH_2)_6OH$, $(CF_3)_2CFCH_2CH_2OH$, $(CF_3)_2CFCH_2CH_2CH_2OH$, $R_fCH_2CH_2SO_2NHCH_2CH_2OH$, $R_fCH_2CH_2SO_2N(CH_3)CH_2CH_2OH$, $R_fCH_2CH_2SO_2N(CH_2CH_3)CH_2CH_2OH$, $R$—$(CF(CF_3)CF_2O)_yCH_2OH$, $CF_2$=$CFOCF_2CF(CF_3)OCF_2CF_2CH_2OH$, or $R_fCH_2OC_2F_4CH_2OCH_2CH_2OH$. Alkoylated compounds made from these alcohols are also useful as hydrophobic surface effect agents.

The three-dimensional solid polymer articles of the present invention optionally further comprise additional components such as surfactants, pH adjusters, cross linkers, wetting agents, pigments, and other functional additives known by those skilled in the art.

The invention further relates to a method of imparting a surface effect to a polymeric article comprising contacting a flowable or liquid polymer composition with 0.1% by weight to 20% by weight of a hydrophobic compound, based on the total weight of the polymer composition, to form a treated polymer composition, and allowing or causing the polymer composition to solidify to form a treated polymeric article, where the treatment composition comprises a hydrophobic compound selected from a cyclic sugar alcohol which is substituted with at least two —$R^1$, —$C(O)R^1$, —$(CH_2CH_2O)_n(CH(CH_3)CH_2O)_mR^2$, —$(CH_2CH_2O)_n(CH(CH_3)CH_2O)_mC(O)R^1$, or mixtures thereof; where the cyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons; each $R^2$ is independently —H, a linear or branched alkyl group having 6 to 30 carbons.

The contacting step may occur by any conventional method, including standard mixing, with a molten polymer composition, with a flowable polymer composition, with a polymer composition dispersion, or with a polymer composition solution. Following the contacting step, the polymer composition having the hydrophobic compound intermixed may be solidified by any conventional method, including by drying, by cooling, or by causing to cool. Drying may be completed with or without heating. Solidification may occur before or after the formation and shaping of the three-dimensional article. The three-dimensional article is formed by any conventional method, including molding, extruding, or spinning a liquid polymer composition having the hydrophobic compound intermixed therein; by thermoforming sheets of the polymeric composition having the hydrophobic compound intermixed therein. For example, a thermoplastic polymer resin may be mixed with the hydrophobic compound while molten, may be extruded and shaped into, for example, fibers, and may be cooled to form the three-dimensional article. The solid three-dimensional polymeric articles are useful in applications including, but not limited to, moisture and grease-resistant packaging, release liners, multilayer constructions, oil- and water-repellent carpet fibers, oil- and water-repellent textile fibers, repellent medical non-woven fabrics, and repellent caulks and other filling sealers.

Materials and Test Methods

All solvents and reagents, unless otherwise indicated, were purchased from Sigma-Aldrich, St. Louis, Mo., and used directly as supplied.

Sorbitan tristearate is available from DuPont Nutrition & Health, Copenhagen, Denmark.

HYTREL 3078 is a thermoplastic polyester elastomer copolymer commercially available from DuPont, Wilmington, Del.

Test Method 1. Evaluation of Water Repellency Via Contact Angle Measurement

Water contact angle measurements are used to test for the migration of additive to the surface of the compression molded sheet samples. Testing is performed by a Ramé-Hart Standard Automated Goniometer Model 200 employing DROPimage standard software and equipped with an automated dispensing system, 250 µl syringe, and illuminated specimen stage assembly is used. The goniometer camera is connected through an interface to a computer, allowing the droplet to be visualized on a computer screen. The horizontal axis line and the cross line can both be independently adjusted on the computer screen using the software.

Prior to contact angle measurement, the sample is placed on the sample stage and the vertical vernier is adjusted to align the horizontal line (axis) of the eye piece coincident to the horizontal plane of the sample. The horizontal position of the stage relative to the eye piece is positioned so as to view one side of the test fluid droplet interface region at the sample interface.

To determine the contact angle of the test fluid on the sample, approximately one drop of test fluid is dispensed onto the sample using a 30 µL pipette tip and an automated dispensing system to displace a calibrated amount of the test fluid. Deionized water is used for water contact angle measurements. Horizontal and cross lines are adjusted via the software in case of the Model 200 after leveling the sample via stage adjustment, and the computer calculates the contact angle based upon modeling the drop appearance. The initial contact angle is the angle determined immediately after dispensing the test fluid to the sample surface. Initial contact angles above 30 degrees are indicators of effective oil repellency.

Test Method 2. Friction Coefficient Measurement

The friction coefficient was measured according to ASTM D1894 "Standard Test Method for Static and Kinetic Coefficients of Friction of Plastic Film and Sheeting".

The sample is cut to a size of 250 mm×130 mm and secured on the test plane. A second test piece is cut to 120 mm square if the specimen is defined as a film, and 63.5 mm square if defined as sheeting, and attached to the sled. Care is taken not to contaminate the test pieces by handling or foreign matter and condition according to ASTM D618.

The sled is attached to the friction tester crosshead, and the driving mechanism is set to a speed of 150±30 mm/min (6.0±1.2 in./min). The initial maximum force reading is recorded, which is the static frictional force. The sliding is continued for another 130 mm. An average force reading is obtained for the kinetic friction. Five data sets are taken on separate samples. The mean coefficient of friction is calculated as p=F/mg, where mg is the sled weight.

Test Method 3. Evaluation of Stain Cleanability

There are seven stains used to evaluate easy clean performance on untreated and treated shims, including grape juice, ketchup, corn oil, mustard, cola, coffee, and ink. The stains were applied in the same layout for each substrate, using a disposable pipette. The volume of the stains applied with a pipette was about 50 µL in order to keep the stain quantity and drop size consistent. The stains were left to dwell for about 15 hours. Using an aspirator, the liquid stains were vacuumed one at a time, wiping the end of the tubing to avoid contaminating different stains.

Once all of the solid and liquid stains were removed, the substrate was placed under a running faucet with warm water to remove some of the stains, and the substrate was wiped and dried with a SONTARA wipe. The samples were placed on the lab bench face up to dry for 4 hours.

Rating Performance:

After the tile is dry rate the stains on a score of 0-4.

0—No visible stain

1—Slight stain perceptible

2—Visible stain without clearly defined outline

3—Stain with a clearly defined outline but not very deep in color

4—Stain with a clearly defined outline, deep in color or stains that penetrated the tile.

Percent Easy Clean Factor (% ECF) is calculated as % ECF=[(40-sum of scores)/40]*100%. A higher % ECF indicates better stain release.

Examples 1-2

Pellets of HYTREL 3078 were dried at 130° F. and blended with sorbitan tristearate, which was in the form of a dry powder, to yield a blend of 2.5% by weight sorbitan tristearate (Example 1) and 5% by weight sorbitan tristearate (Example 2). The powder/pellet blends were fed to a Davis Standard 1.5" extruder operating at 25 rpm. The extruder had a length/diameter ratio of 24:1 and was equipped with a screw fitted with a Saxton mixer located at the end of the metering section in order to provide uniform temperature and dispersion of the additives within the melt. The compression ratio of the screw (depth of the feed section to the depth of the metering section) was approximately 3.2 to 1. The temperature profile for the extruder was kept at or below 410° F. (210° C.) to minimize any potential thermal degradation.

Extrudate was processed on a wire-line to produce an insulation ~25 mil (~0.64 mm) in thickness on a 7 stranded 18 AWG bare copper conductor have a diameter of ~48 mils (~1.2 mm). The material was extruded onto wire at a speeds of ~60 to 65 ft/min via a tubing configuration consisting of a die have an inner diameter of 180 mils (4.6 mm) and a guider tip outer diameter of 90 mils (2.3 mm). The die and guider tip combinations yielded draw down ratios (cross-sectional area of the die area/cross-sectional area of the finished extrudate) of ~3.5.

Additionally, extrudate was collected to be utilized in post extrusion molding operations to create small flat sheets for testing. The resulting extrudates were dried overnight at 130° F. where they were compression molded into sheets approximately 6 inches (~152 mm) square with a thickness of ~30 mils (~0.76 mm). Approximately 16.5 to 17 grams of material was placed between two sheets of polytetrafluoroethylene (PTFE) within a picture frame shim used to achieve the desired dimensions. The stack consisting of the PTFE sheeting, shim, and material was placed between 2 metal plates and then transferred to a hot press with platens set to a temperature of 392° F. (200° C.). The pressure within the press was raised and maintained at ~5 lbs for a time period of 8 minutes. After this time period allowing the material to soften, the pressure was raised to 10 tons and released multiple times within a one minute period and then maintained at 10 tons for an additional minute allowing the material to flow and acquire the desired dimensions. The pressure was then released and the stack transferred to a water cooled press where the material was held for approximately 5 minutes under low pressure until the sample cooled for removal from the shims. The sheets were tested according to the test methods above.

Comparative Example A

Example 1 was repeated, without the addition of sorbitan tristearate.

TABLE 1

Contact Angle and Friction Coefficient Measurement of Sheets

| Example | Water Contact Angle | Coefficient of Friction |
| --- | --- | --- |
| 1 | 134.75 | 0.314 |
| 2 | 136.00 | 0.383 |
| A | 116.43 | 0.479 |

TABLE 2

Stain Cleanability Ratings of Sheets

| | Example | | |
|---|---|---|---|
| | A | 1 | 2 |
| Grape juice | 1 | 0 | 0 |
| ketchup | 2 | 0 | 0 |
| Corn oil | 2 | 2 | 2 |
| Mustard | 4 | 4 | 3 |
| Coke | 0 | 0 | 0 |
| Coffee | 3 | 1 | 2 |
| Ink | 0 | 0 | 0 |
| Average Rating | 1.71 | 1.00 | 1.00 |
| % ECF | 66.67 | 80.56 | 80.56 |

TABLE 3

Stain Cleanability Ratings of Extruded Wire

| | Example | | |
|---|---|---|---|
| | A | 1 | 2 |
| Grape juice | 1 | 0 | 0 |
| ketchup | 2 | 0 | 0 |
| Corn oil | 2 | 2 | 2 |
| Mustard | 4 | 4 | 3 |
| Coke | 0 | 0 | 0 |
| Coffee | 3 | 1 | 2 |
| Ink | 0 | 0 | 0 |
| Average Rating | 1.71 | 1.00 | 1.00 |
| % ECF | 66.67 | 80.56 | 80.56 |

The invention claimed is:

1. A three-dimensional solid polymeric article having surface effects comprising 60 to 99.9% of a polymer composition and 0.1 to 20% by weight of a hydrophobic compound, based on the total weight of the solid polymeric article,
where the hydrophobic compound is intermixed throughout the polymer composition and throughout the three-dimensional solid polymeric article;
where the hydrophobic compound is selected from Formula (Ia'):

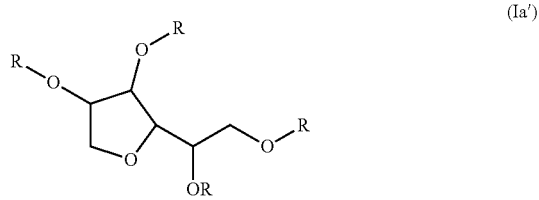

(Ia')

wherein R is further limited to independently —H; or —$(CH_2CH_2O)_n(CH(CH_3)CH_2O)_mC(O)R^1$;
each n is independently 0 to 20;
each m is independently 0 to 20;
m+n is greater than 0;
each $R^1$ is independently a linear or branched alkyl group having 5 to 29 carbons;
provided at least one R is —H and at least two R groups are —$(CH_2CH_2O)_n(CH(CH_3)CH_2O)_mC(O)R^1$;
wherein the polymer composition is a polymer selected from thermoplastic urethanes; thermoplastic elastomer polyesters; or a thermoplastic resin, a thermoset resin, an elastomer resin, or an amorphous polymer selected from linear polyamides, polystyrene and polystyrene copolymers, polyethylene and polyethylene copolymers, polypropylene and polypropylene copolymers, poly(acrylic acid) and poly(acrylic acid) copolymers, poly(methyl methacrylate) and poly(methyl methacrylate) copolymers, poly(methyl acrylate) and poly(methyl acrylate) copolymers, polymethacrylate and polymethacrylate copolymers, polyacrylate and polyacrylate copolymers, polyvinyl chloride and polyvinyl chloride copolymers, polycarbonates and polycarbonate copolymers, polycaprolactones and polycaprolactone copolymers, silicones, fluoroolefins, and fluoroelastomers.

2. The solid polymeric article of claim 1, where the hydrophobic compound is substituted with at least three —$(CH_2CH_2O)_n(CH(CH_3)CH_2O)_mC(O)R^1$.

3. The solid polymeric article of claim 1, further comprising at least one hydrophobic surface effect agent which provides a surface effect, where the hydrophobic surface effect agent is intermixed with the polymer composition and the hydrophobic compound.

4. The solid polymeric article of claim 3, comprising 1 to 5% by weight of the hydrophobic compound, and 1 to 5% by weight of the hydrophobic surface effect agent, based on the total weight of the polymeric article.

5. The solid polymeric article of claim 3, wherein the hydrophobic surface effect agent is selected from the group consisting of non-fluorinated or fluorinated cationic acrylic polymers, non-fluorinated or fluorinated anionic acrylic polymers, non-fluorinated or fluorinated nonionic acrylic polymers, partially fluorinated urethanes, fluorinated ethoxylates, fluorinated alcohols, fluorinated phosphate acids, non-fluorinated urethanes, silicones, waxes, and mixtures thereof.

6. The solid polymeric article of claim 1, comprising 1 to 10% by weight of the hydrophobic compound, based on the total weight of the polymeric article.

7. A method of imparting a surface effect to a polymeric article comprising contacting 60 to 99.9% of a flowable or liquid polymer composition with 0.1° A by weight to 20% by weight of a hydrophobic compound, based on the total weight of the polymer composition, to form a treated polymer composition, and allowing or causing the treated polymer composition to solidify to form a treated polymeric article,
where the hydrophobic compound is selected from Formula (Ia'):

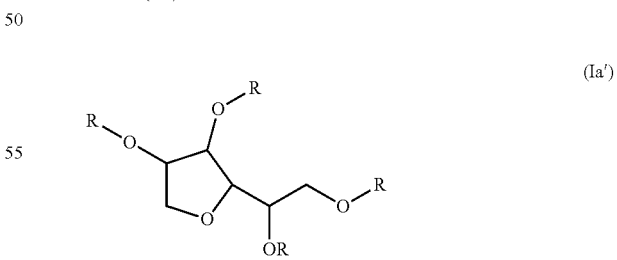

(Ia')

wherein R is further limited to independently —H; or —$(CH_2CH_2O)_n(CH(CH_3)CH_2O)_mC(O)R^1$;
each n is independently 0 to 20;
each m is independently 0 to 20;
m+n is greater than 0;
each $R^1$ is independently a linear or branched alkyl group having 5 to 29 carbons;

provided at least one R is —H and at least two R groups are —(CH$_2$CH$_2$O)$_n$(CH(CH$_3$)CH$_2$O)$_m$C(O)R$^1$;

wherein the polymer composition is a polymer resin selected from thermoplastic urethanes; thermoplastic elastomer polyesters; or a thermoplastic resin, a thermoset resin, an elastomer resin, or an amorphous polymer selected from linear polyamides, polystyrene and polystyrene copolymers, polyethylene and polyethylene copolymers, polypropylene and polypropylene copolymers, poly(acrylic acid) and poly(acrylic acid) copolymers, poly(methyl methacrylate) and poly(methyl methacrylate) copolymers, poly(methyl acrylate) and poly(methyl acrylate) copolymers, polymethacrylate and polymethacrylate copolymers, polyacrylate and polyacrylate copolymers, polyvinyl chloride and polyvinyl chloride copolymers, polycarbonates and polycarbonate copolymers, polycaprolactones and polycaprolactone copolymers, silicones, fluoroolefins, and fluoroelastomers.

8. The method of claim 7, further comprising the step of molding, extruding, or spinning the treated polymer composition prior to solidification.

9. The method of claim 7, further comprising the step of thermoforming the treated polymeric article to form a treated three dimensional polymeric article.

* * * * *